United States Patent
Zhao et al.

(10) Patent No.: US 9,961,703 B2
(45) Date of Patent: May 1, 2018

(54) METHODS AND SYSTEMS FOR PATCHING DIRECT-MODE TALKGROUPS AMONG DUAL-WATCH MOBILE RADIOS

(71) Applicant: MOTOROLA SOLUTIONS, INC, Chicago, IL (US)

(72) Inventors: Kang-Kai Zhao, Chengdu (CN); Da-Jun Chen, Chengdue (CN); Ya-Hui Gong, Chengdu (CN); Yi Tang, Chengdu (CN); Yong Tian, Chengdu (CN); Wu Yang, Chengdu (CN); Dong Zhao, Chengdu (CN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days. days.

(21) Appl. No.: 15/507,343

(22) PCT Filed: Dec. 24, 2014

(86) PCT No.: PCT/CN2014/094786
§ 371 (c)(1),
(2) Date: Feb. 28, 2017

(87) PCT Pub. No.: WO2016/101170
PCT Pub. Date: Jun. 30, 2016

(65) Prior Publication Data
US 2017/0303318 A1    Oct. 19, 2017

(51) Int. Cl.
*H04B 7/00* (2006.01)
*H04W 76/00* (2018.01)
*H04W 4/08* (2009.01)

(52) U.S. Cl.
CPC .......... *H04W 76/005* (2013.01); *H04W 4/08* (2013.01)

(58) Field of Classification Search
CPC ....... H04W 4/08; H04W 76/005; H04W 4/10; H04W 92/18; H04W 40/246;
(Continued)

(56) References Cited

U.S. PATENT DOCUMENTS 6,449,491 B1 * 9/2002 Dailey .................... H04W 4/10
455/518
8,085,671 B2   12/2011 Shaffer et al.
(Continued)

FOREIGN PATENT DOCUMENTS

AU    2012355540 A1    6/2013
GB       2409129 A    6/2005

OTHER PUBLICATIONS

The International Search Report and the Written Opinion, corresponding patent application No. PCT/CN2014/094786, filed: Dec. 24, 2014, all pages.

*Primary Examiner* — Shaima Q Aminzay

(57) ABSTRACT

Disclosed herein are methods and systems for patching direct-mode talkgroups among dual-watch mobile radios. A mobile radio has first and second receivers, and is in a first talkgroup having a first channel. The mobile radio resides the first receiver on the first channel, and detects either a first patch event or a second patch event. The first patch event is an instruction for a first-channel session. The second patch event is an invitation for a second-channel session. Upon detecting the first patch event, the mobile radio transmits an invitation on the first channel and also on one or more other channels respectively associated with one or more other talkgroups, directing all recipients to the first channel. If the mobile radio detects the second patch event, the mobile radio resides the second receiver on the second channel.

20 Claims, 15 Drawing Sheets

(58) Field of Classification Search
CPC ... H04W 8/005; H04W 36/32; H04W 68/005; H04W 76/023; H04W 76/025; H04W 88/06
USPC .......................................... 455/518, 519, 521
See application file for complete search history.

(56) References Cited

U.S. PATENT DOCUMENTS

| | | |
|---|---|---|
| 8,620,371 B2 | 12/2013 | Jorgensen |
| 2003/0144003 A1 | 7/2003 | Ranta et al. |
| 2005/0143135 A1 | 6/2005 | Brems et al. |

* cited by examiner

_500_

| TALKGROUP | RADIO CHANNEL |
|-----------|---------------|
| TG301 | CHANNEL1 |
| TG302 | CHANNEL2 |
| TG303 | CHANNEL3 |
| ... | ... |
| ... | ... |

*FIG. 5*

METHODS AND SYSTEMS FOR PATCHING DIRECT-MODE TALKGROUPS AMONG DUAL-WATCH MOBILE RADIOS

BACKGROUND OF THE INVENTION

It is important for public-safety responders to be able to communicate with each other on a regular basis. As a result, one of the most commonly used tools in the public-safety context is a mobile radio. Some mobile radios communicate via cellular radio networks, some communicate via ad-hoc device-to-device connections (as part of, e.g., an ad-hoc network of such connections); such communication is referred to interchangeably in this disclosure at various times using adjectives such as direct, direct-mode, localized, point-to-point, peer-to-peer, and the like. Some mobile radios are equipped, programmed, and configured to be able to communicate via both cellular networks and ad-hoc arrangements, perhaps in addition to being able to communicate according to one or more other configurations. Mobile radios may be incorporated into or with one or more other devices such as cell phones, smartphones, tablets, notebook computers, laptop computers, and the like. Moreover, some mobile radios are referred to at times using terms such as handheld, handheld transceiver, walkie-talkie, two-way radio, and the like. As one example, some devices include the functionality of both a smartphone and a mobile radio. And certainly many other examples could be listed, as known to those having skill in the relevant art.

Public-safety personnel utilize mobile radios in talkgroups so that multiple responders can simultaneously hear what one person is saying, and so that talkgroup members can respond in an easy and effective fashion. This is far more efficient than a responder serially sending out the same message to a plurality of allies. It is desirable for a public-safety responder to be able to communicate with as many allies as possible as efficiently as possible for at least the reason that the immediacy and efficacy with which public-safety responders can communicate with one another are quite often determinative with respect to how positive the ultimate outcome of a given incident can be. Accordingly, there is a need for methods and systems for patching direct-mode talkgroups among dual-watch mobile radios.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5 depicts an example data table maintained by an example mobile radio, in accordance with an embodiment.

Figure 1:
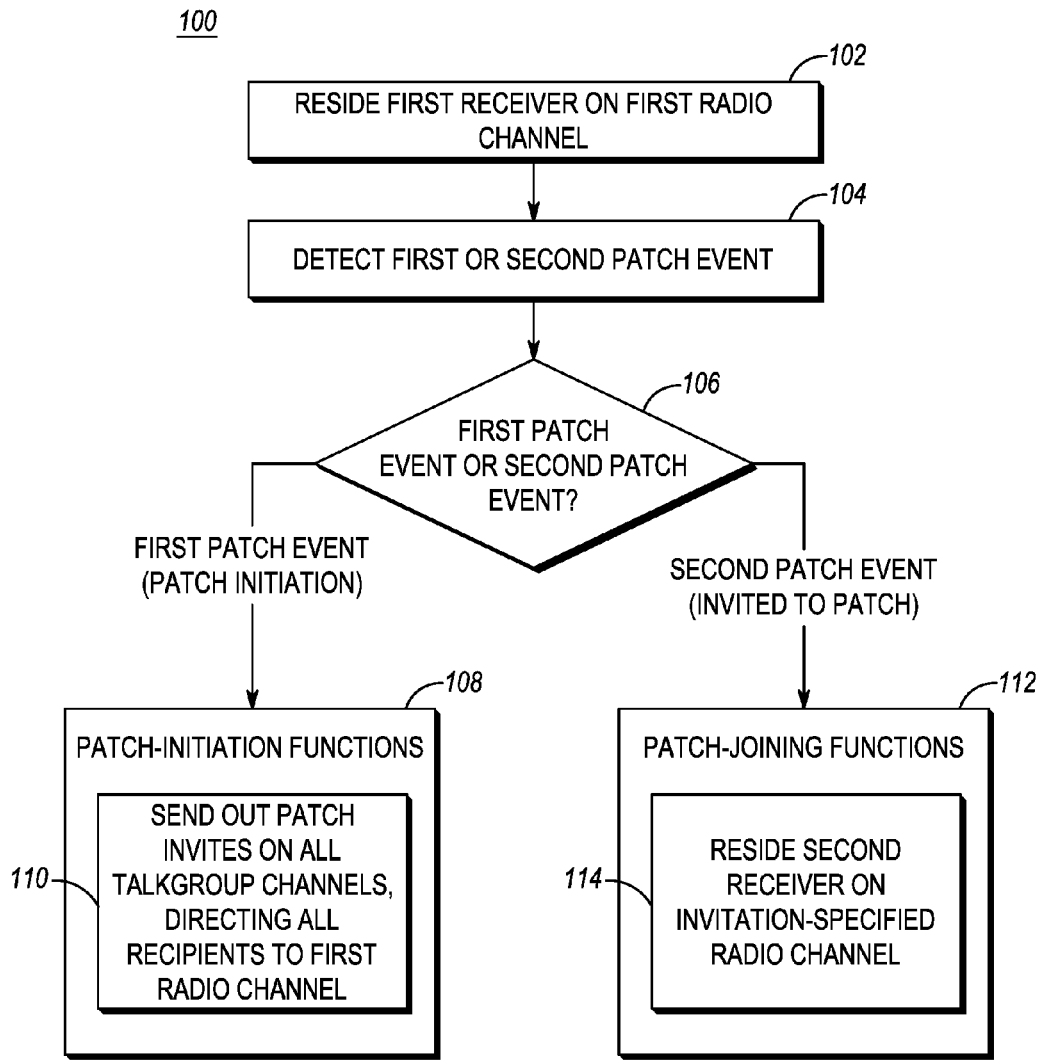
FIG. 1 depicts an example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for patching direct-mode talkgroups among dual-watch mobile radios.

One embodiment takes the form of a process carried out by a mobile radio that is a member of a first talkgroup associated with a first radio channel. The mobile radio includes first and second receivers. The process includes residing the first receiver on the first radio channel, and also includes detecting either a first patch event or a second patch event. The first patch event is receipt of a patch-initiation instruction for a first-channel patched-talkgroup session. The second patch event is receipt of a patch invitation on the first radio channel from a second mobile radio that is a member of a second talkgroup associated with a second radio channel, where the received patch invitation specifies the second radio channel for a second-channel patched-talkgroup session. The process includes, responsive to detecting the first patch event, carrying out a set of patch-initiation functions that includes transmitting a patch invitation on each radio channel in a set of radio channels that are respectively associated with talkgroups in a set of talkgroups that includes the first talkgroup and at least one other talkgroup, where each transmitted patch invitation specifies the first radio channel for the first-channel patched-talkgroup session. The process includes, responsive to detecting the second patch event, carrying out a set of patch-joining functions that includes residing the second receiver on the second radio channel for the second-channel patched-talkgroup session.

Another embodiment takes the form of a mobile radio that is a member of a first talkgroup associated with a first radio channel. The mobile radio includes a wireless-communication interface that includes first and second receivers, a processor, and data storage containing instructions executable by the processor for causing the mobile radio to carry out a set of functions that includes at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the mobile radio detects the first patch event.

In at least one embodiment in which the mobile radio detects the first patch event, the set of patch-initiation functions includes at least one of (i) receiving audio on the first radio channel as a participant in the first-channel patched-talkgroup session and (ii) transmitting audio on the first radio channel as a participant in the first-channel patched-talkgroup session.

In at least one embodiment in which the mobile radio detects the first patch event, the mobile radio includes a user interface, and the mobile radio receives the patch-initiation instruction via the user interface.

In at least one embodiment in which the mobile radio detects the first patch event, the mobile radio receives the patch-initiation instruction over an air interface.

In at least one embodiment in which the mobile radio detects the first patch event, the received patch-initiation instruction identifies the at least one other talkgroup in the set of talkgroups. In at least one such embodiment, the mobile radio includes a user interface, presents at least one selectable talkgroup via the user interface, and receives the patch-initiation instruction via the user interface; in at least one such embodiment, the received patch-initiation instruction indicates at least one presented talkgroup as selected, and the at least one other talkgroup in the set of talkgroups includes the at least one selected talkgroup.

In at least one embodiment in which the mobile radio detects the first patch event, the mobile radio maintains stored channel data that lists each talkgroup in the set of talkgroups and the respectively associated radio channels. In at least one such embodiment, transmitting the patch invitations includes referencing the stored channel data to identify the radio channels respectively associated with the talkgroups in the set of talkgroups.

In at least one embodiment in which the mobile radio detects the first patch event, the mobile radio transmits a patch termination on the first radio channel regarding the first-channel patched-talkgroup session. In at least one such embodiment, the mobile radio transmits the patch termination responsive to detecting an expiration of a hang timer.

In at least one embodiment, the mobile radio detects the second patch event.

In at least one embodiment in which the mobile radio detects the second patch event, the set of patch-joining functions includes at least one of (i) receiving audio on the second radio channel as a participant in the second-channel patched-talkgroup session and (ii) transmitting audio on the second radio channel as a participant in the second-channel patched-talkgroup session.

In at least one embodiment in which the mobile radio detects the second patch event, the mobile radio unmutes the second radio channel. In at least one such embodiment, the mobile radio validates the second-channel patched-talkgroup session prior to unmuting the second radio channel.

In at least one embodiment in which the mobile radio detects the second patch event, residing the first receiver on the first radio channel includes monitoring the first radio channel via the first receiver, and the set of patch-joining functions includes: continuing to monitor the first radio channel via the first receiver after residing the second receiver on the second radio channel for the second-channel patched-talkgroup session; during that session, detecting a query from a third mobile radio on the first radio channel via the first receiver, and responsively transmitting, to the third mobile radio on the first radio channel, a response to the query, the response directing the third mobile radio to reside its second receiver on the second radio channel for the second-channel patched-talkgroup session. In at least one such embodiment, the set of patch-joining functions includes: initiating a random-duration timer responsive to detecting the query from the third mobile radio on the first radio channel, and the mobile radio transmits the response to the query responsive to detecting an expiration of the random-duration timer without first having detected any other responses to the query on the first radio channel.

In at least one embodiment in which the mobile radio detects the second patch event, the mobile radio receives a patch termination on the second radio channel regarding the second-channel patched-talkgroup session, and responsively carries out at least one of muting the second receiver and tuning the second receiver away from the second radio channel.

In at least one embodiment, the first and second talkgroups are respectively associated with first and second public-safety agencies.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseam in this detailed description.

FIG. 1 depicts an example process, in accordance with an embodiment. In particular, FIG. 1 depicts a process 100 that in at least one embodiment is carried out by a mobile radio that is a member of a first talkgroup associated with a first radio channel. The description of the process 100 as being carried out by a mobile radio is provided by way of example, as other suitably equipped and programmed devices could carry out the process 100, as known to those in the art. In the embodiment that is depicted in FIG. 1, the example process 100 is described as being carried out by a dual-watch mobile radio that is operating in direct mode. The example mobile radio is a dual-watch mobile radio in that it has both a first and second receiver.

At step 102, the mobile radio resides its first receiver on the first radio channel. The mobile radio may tune its first receiver to the first radio channel, which as stated above is the radio channel that is associated with the first talkgroup, of which the mobile radio is a member. The mobile radio may monitor communications on the first radio channel using the first receiver.

At step 104, the mobile radio detects either what is referred to herein as a first patch event or what is referred to as a second patch event.

As the term is used in this disclosure, the first patch event is receipt of a patch-initiation instruction for a first-channel patched-talkgroup session. A patched-talkgroup session is a talkgroup session involving at least one mobile radio from each of multiple talkgroups. In one example embodiment, the multiple talkgroups are respectively associated with different public-safety agencies (e.g., police, fire, rescue). A first-channel patched-talkgroup session, then, is a patched-talkgroup session that is conducted on the first radio channel.

As the term is used in this disclosure, the second patch event is receipt of a patch invitation on the first radio channel from a second mobile radio that is a member of a second talkgroup associated with a second radio channel, where the received patch invitation specifies the second radio channel for a second-channel patched-talkgroup session, which is a patched-talkgroup session that is conducted on the second radio channel.

At step 106, the mobile radio determines whether the mobile radio detected an instance of the first patch event or rather an instance of the second patch event at step 104.

If the mobile radio determines at step 106 that the mobile radio detected the first patch event, then the mobile radio responsively carries out, at step 108, a set of patch-initiation functions, which includes the step 110, at which the mobile radio transmits a patch invitation on each radio channel in a set of radio channels that are respectively associated with talkgroups in a set of talkgroups. The set of talk groups includes the first talkgroup and at least one other talkgroup, and each transmitted patch invitation specifies the first radio channel for the first-channel patched-talkgroup session.

If the mobile radio determines at step 106 that the mobile radio detected the second patch event, then the mobile radio responsively carries out, at step 112, a set of patch-joining functions, which includes the step 114, at which the mobile radio resides its second receiver on the second radio channel for the second-channel patched-talkgroup session. These steps are further described and illustrated below.

Figure 2:
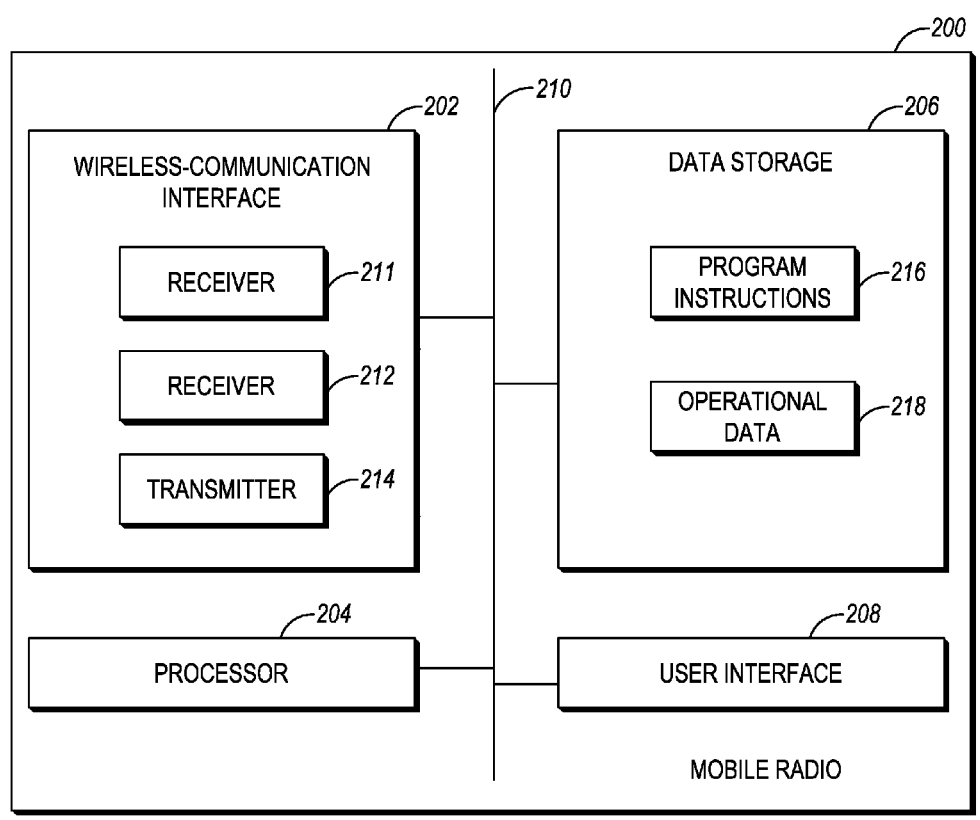
FIG. 2 depicts an example mobile radio, in accordance with an embodiment.

FIG. 2 depicts an example mobile radio, in accordance with an embodiment. In particular, FIG. 2 depicts an example mobile radio 200 as including a wireless-communication interface 202, a processor 204, a data storage 206, and a user interface 208, all of which are communicatively coupled with one another via a system bus 210 (or other suitable communication connection, network, or the like).

In the depicted example, the wireless-communication interface 202 includes a receiver 211, a receiver 212, and a transmitter 214. In the parlance of the present disclosure, the receiver 211 is the first receiver of the example mobile radio 200, and the receiver 212 is the second receiver of the example mobile radio 200. Each of the receivers 211 and 212 can be independently configured to reside on (i.e., be tuned to) different radio channels, and the transmitter 214 can be configured to transmit on different radio channels. In general, the components of the wireless-communication interface 202 can be configured to operate according to one or more types and/or protocols for wireless communication, some examples including LTE, APCO P25, Wi-Fi, ETSI DMR, TETRA, and the like. The wireless-communication interface 202 may therefore include any necessary hardware (e.g., chipsets, antennas, etc.), any necessary firmware, and any necessary software for conducting one or more forms of communication with one or more other entities as described herein. In at least one embodiment, the example mobile radio 200 also includes an interface for engaging in wired forms of communication.

The processor 204 may include one or more processors of any type deemed suitable by those of skill in the relevant art, some examples including a general-purpose microprocessor and a dedicated digital signal processor (DSP).

The data storage 206 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 2, the data storage 206 contains program instructions 216 executable by the processor 204 for carrying out various functions described herein, and further is depicted as containing operational data 218, which may include any one or more data values stored by and/or accessed by the example mobile radio 200 in carrying out one or more of the functions described herein.

The user interface 208 may include one or more input devices (a.k.a. components and the like) and/or one or more output devices (a.k.a. components and the like). With respect to input devices, the user interface 208 may include one or more touchscreens, buttons, switches, microphones, and the like. With respect to output devices, the user interface 208 may include one or more displays, speakers, light emitting diodes (LEDs), and the like. Moreover, one or more components (e.g., an interactive touchscreen and display) of the user interface 208 could provide both user-input and user-output functionality. And certainly other components (e.g., a PTT button) could be implemented in a given context, as known to those of skill in the art.

Figure 3:
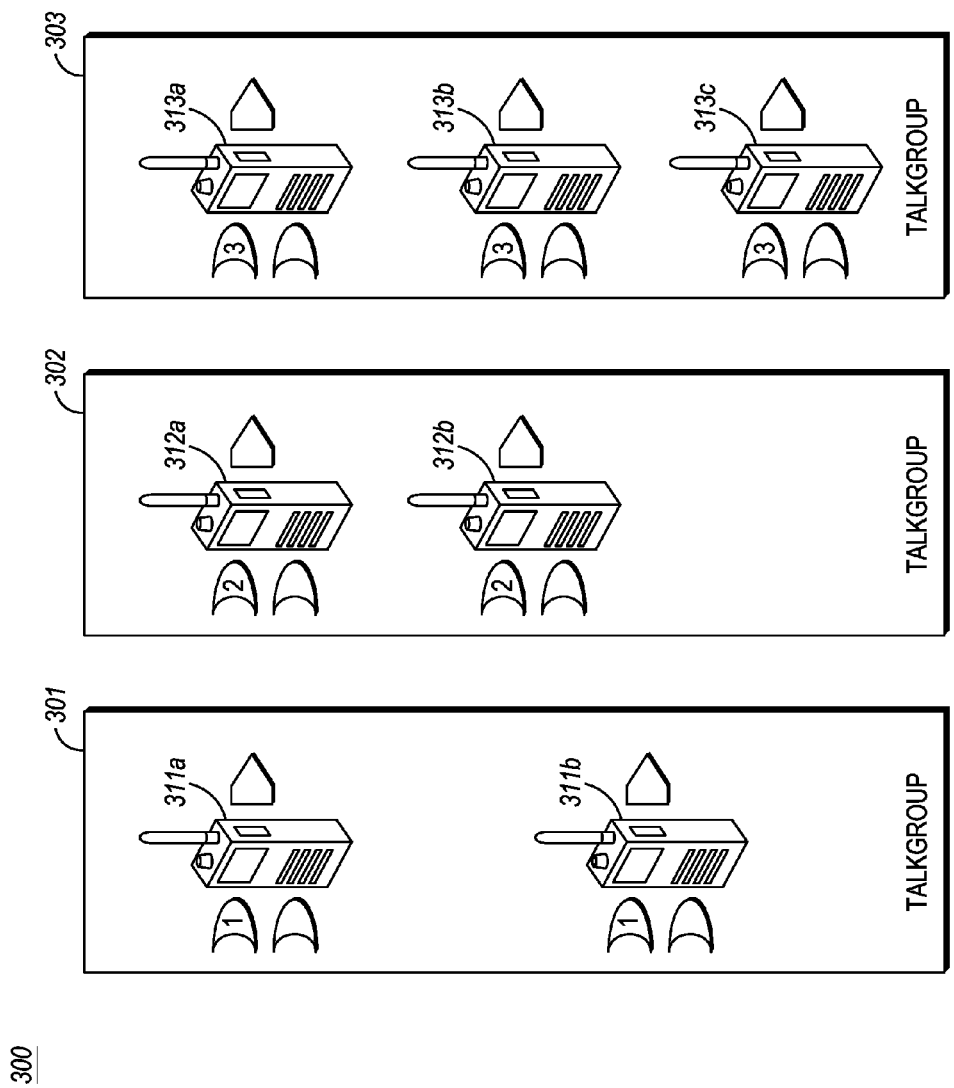
FIG. 3 depicts a first example scenario involving a plurality of mobile radios, in accordance with an embodiment.

FIG. 3 depicts a first example scenario involving a plurality of mobile radios, in accordance with an embodiment. In particular, FIG. 3 depicts seven example mobile radios delineated into three example talkgroups. The depiction of seven mobile radios is purely by way of example, as other numbers of mobile radios could certainly depicted in connection with various example scenarios. Moreover, the depiction of the various talkgroups as each including two or three respective mobile radios is also by way of example, as a given talkgroup could at any given time include any number of mobile radios. As one example, the talkgroups that are described in this disclosure could be push-to-talk (PTT) talkgroups. Moreover, there could be additional mobile radios that are members of the depicted talkgroups but that are not depicted at a given instant due to being out of range, powered off, and/or the like.

As can be seen in FIG. 3, an example talkgroup 301 includes example mobile radios 311a and 311b, an example talkgroup 302 includes example mobile radios 312a and 312b, and an example talkgroup 303 includes example mobile radios 313a, 313b, and 313c. In FIG. 3, as is the case in FIGS. 4 and 6-13, each example mobile radio has a structure similar to that of the example mobile radio 200 of FIG. 2. As such, each example mobile radio has at least two receivers and at least one transmitter. Each mobile radio is depicted along with a transmit-channel indicator on its right side and two receive-channel indicators on its left side.

Each transmit-channel indicator takes the form of a right-pointing arrow having therein a textual indication of the radio channel, if any, that the respective mobile radio's transmitter is tuned to at that moment. Each receive-channel indicator takes the form of a crescent having a concave side facing to the left; each receive-channel indicator has therein a similar textual indication of the radio channel on which the respective receiver is currently residing (i.e., the radio channel to which the respective receiver is currently tuned). By convention, the upper receive-channel indicator represents the particular mobile radio's first receiver, while the lower receive-channel indicator represents the particular mobile radio's second receiver. The radio channels are represented using simple digits (e.g., "1," "2," "3," etc.), though in actual implementations these numbers would correspond to different frequencies.

In the example scenario 300 that is depicted in FIG. 3, the mobile radios 311a and 311b of talkgroup 301 have each resided their first receiver on channel 1, which is the radio channel that is associated with talkgroup 301. The mobile radios 312a and 312b of talkgroup 302 have each resided their first receiver on channel 2, which is the radio channel that is associated with talkgroup 302. The mobile radios 313a, 313b, and 313c of talkgroup 303 have each resided their first receiver on channel 3, which is the radio channel that is associated with talkgroup 303.

Figure 4:
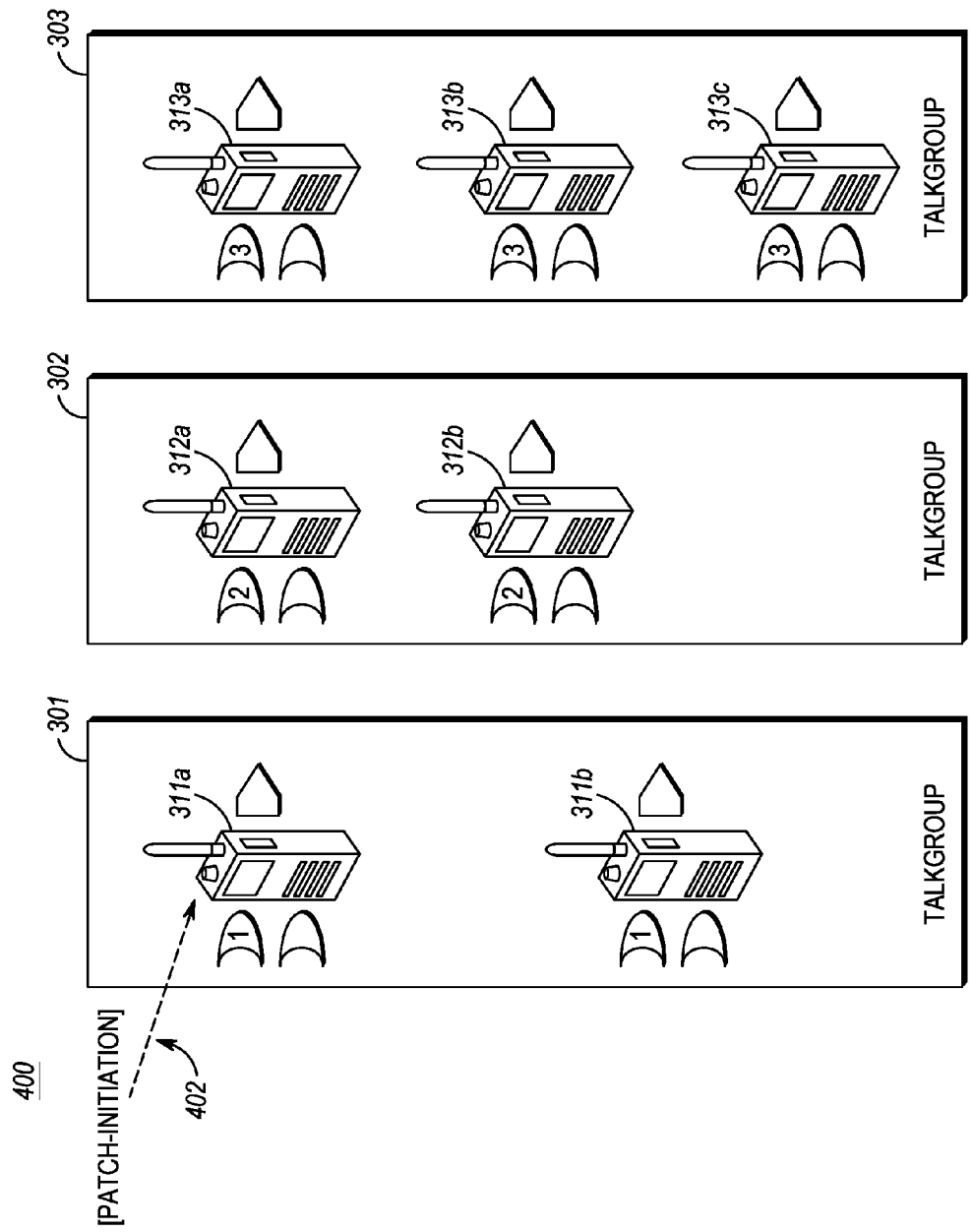
FIG. 4 depicts a second example scenario involving the mobile radios of FIG. 3, in accordance with an embodiment.

FIG. 4 depicts a second example scenario involving the mobile radios of FIG. 3, in accordance with an embodiment. In particular, FIG. 4 depicts a scenario 400 that follows the scenario 400 in the example series of events that is depicted in and described in connection with FIGS. 3-4 and 6-13. Indeed, each example scenario that is depicted in each of FIGS. 4 and 6-13 can be interpreted as following from the respectively preceding example scenario.

In the example scenario 400 of FIG. 4, the mobile radio 311a receives a patch-initiation instruction, as depicted at 402. As such, the example scenario 400 is a scenario in which the mobile radio 311a detects the first patch event. The mobile radio 311a may receive the patch-initiation instruction from a remote entity over an air interface; as examples, the mobile radio 311a could receive the patch-initiation instruction from another mobile radio or from an infrastructure entity such as a base station. In other instances, the mobile radio 311a may receive the patch-initiation instruction via its user interface. In such instances, a user may select a menu item, enter a voice command, or otherwise cause the mobile radio 311a to receive the patch-initiation instruction.

Whether the mobile radio 311a receives the patch-initiation instruction via an air interface or via a user interface (or in some other way), the received patch-initiation instruction may identify one or more talkgroups (in addition to the talkgroup of which the mobile radio 311a is a member) as being talkgroups to invite to a patched-talkgroup session. In an embodiment, the mobile radio 311a presents one or more selectable indications or other identifications (e.g., checkboxes) corresponding to one or more other talkgroups, and receives via the user interface a user selection of one or more talkgroups (in addition to the talkgroup 301) to invite to a patched-talkgroup session. In such instances, the received patch-initiation instruction indicates the user-selected talkgroups, which the mobile radio 311a then responsively invites (perhaps along with one or more other talkgroups) to a patched-talkgroup session. In this example, the received patch-initiation instruction indicates to invite the talkgroup 302 and the talkgroup 303 (and the talkgroup 301) to a patched-talkgroup session.

FIG. 5 depicts an example data table maintained by an example mobile radio, in accordance with an embodiment. In at least one embodiment, upon receiving a patch-initiation instruction to invite the talkgroups 301, 302, and 303 to a patched-talkgroup session, the mobile radio 311a responsively references a table to stored channel data that lists a number of talkgroups and the radio channels that are respectively associated with those talkgroups. One example such table is the example table 500 of FIG. 5. As depicted, the example table 500 includes listings of talkgroup 301 ("TG301") being associated with radio channel 1 ("CHANNEL1"), talkgroup 302 ("TG302") being associated with radio channel 2 ("CHANNEL2"), and talkgroup 303 ("TG303") being associated with radio channel 3 ("CHANNEL3"). Several empty rows are also depicted in the table 500, indicating that further talkgroups and associated radio channels could also be stored therein. Thus, once the mobile radio 311a has referenced the table 500, the mobile radio 311a has identified that talkgroup 301 operates on channel 1, talkgroup 302 operates on channel 2, and talkgroup 303 operates on channel 3.

Figure 6:
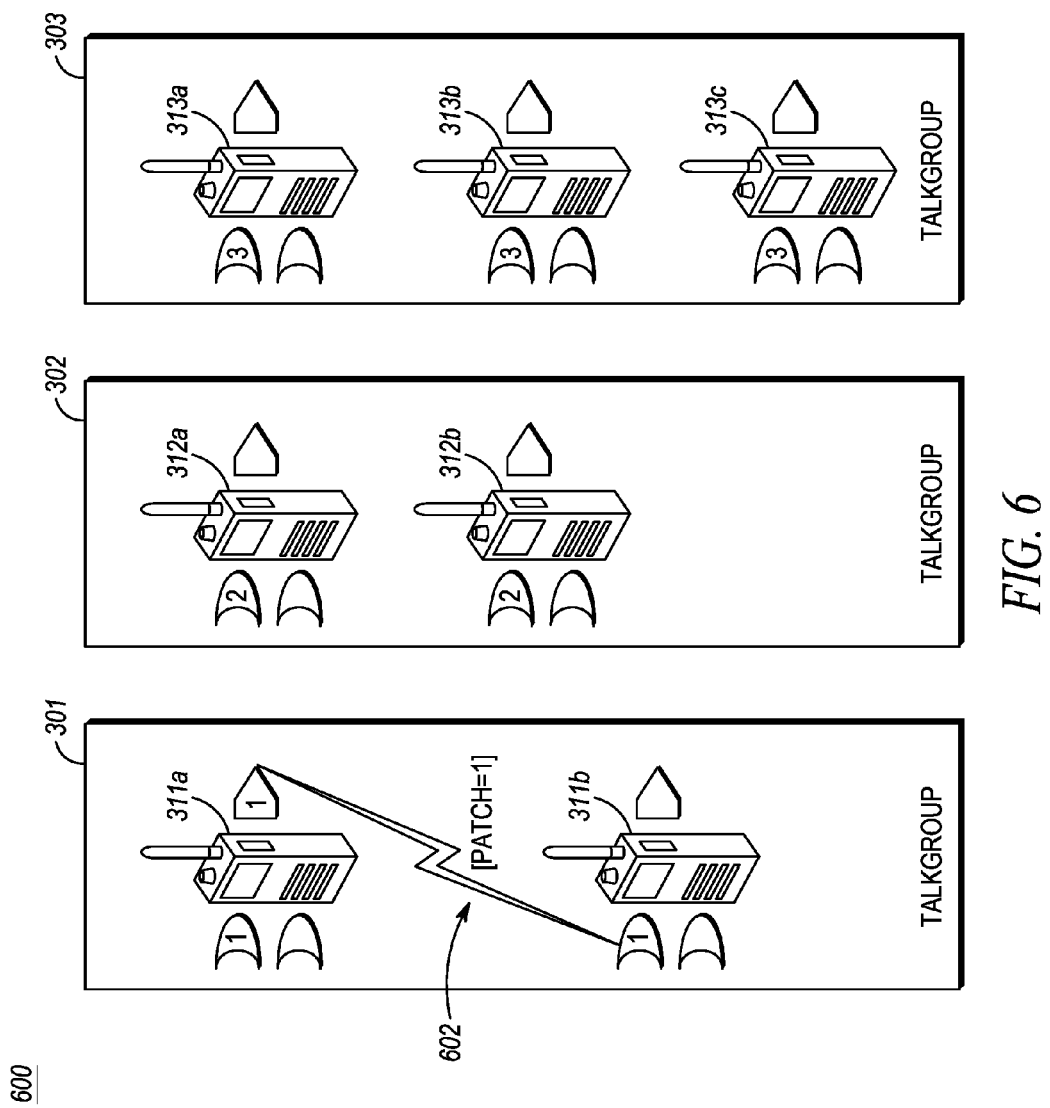
FIG. 6 depicts a third example scenario involving the mobile radios of FIG. 3, in accordance with an embodiment.

FIG. 6 depicts a third example scenario involving the mobile radios of FIG. 3, in accordance with an embodiment. In the example scenario 600 of FIG. 6, the mobile radio 311a transmits a patch invite on channel 1, which is the radio channel that is associated with talkgroup 301, of which the mobile radio 311a is a member. This patch invite is shown at 602, and specifies that the mobile radio 311a is inviting the mobile radio 311b (and any other mobile radios in talkgroup 301) to participate in a patched-talkgroup session on channel 1.

Figure 7:
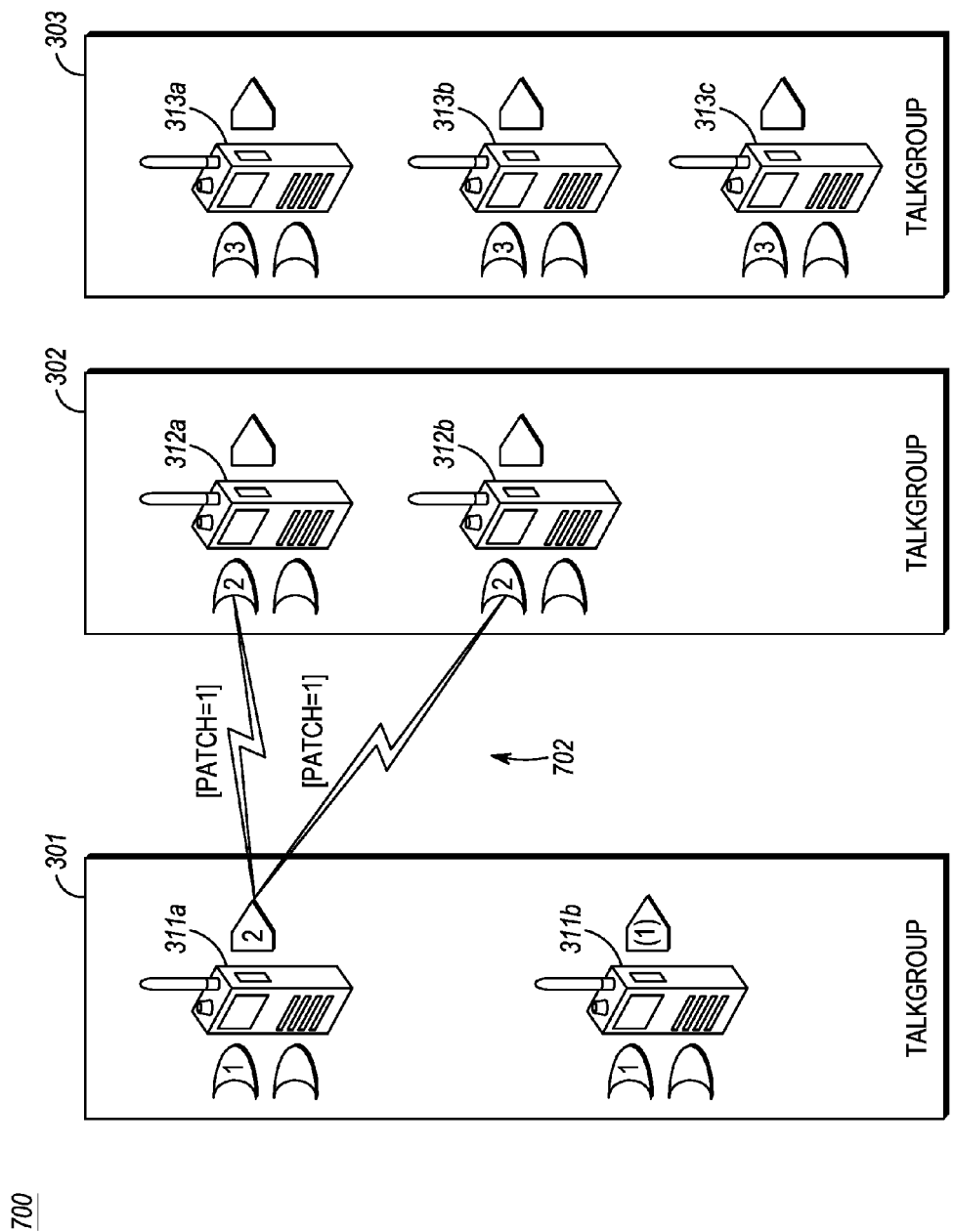
FIG. 7 depicts a fourth example scenario involving the mobile radios of FIG. 3, in accordance with an embodiment.

FIG. 7 depicts a fourth example scenario involving the mobile radios of FIG. 3, in accordance with an embodiment. In the example scenario 700 of FIG. 7, it can be seen that the mobile radio 311b has kept its first receiver on channel 1 in order to participate in the patched-talkgroup session. The mobile radio 311b is also depicted in FIG. 7 has having a "(1)" indication in its transmit-channel indicator. As used in this description, that indication does not necessarily mean that the mobile radio is actually transmitting on channel 1; instead, it essentially means that the mobile radio is participating in the patched-talkgroup session on channel 1, and that, if the mobile radio were going to transmit as part of that patched-talkgroup session, it would do so on channel 1. It can further be seen in the example scenario 700 that the mobile radio 311a transmits a patch invite on channel 2, which is the radio channel that is associated with talkgroup 302. This patch invite is shown at 702, and specifies that the mobile radio 311a is inviting the mobile radios 312a and 312b (and any other mobile radios in talkgroup 302) to participate in a patched-talkgroup session on channel 1.

Figure 8:
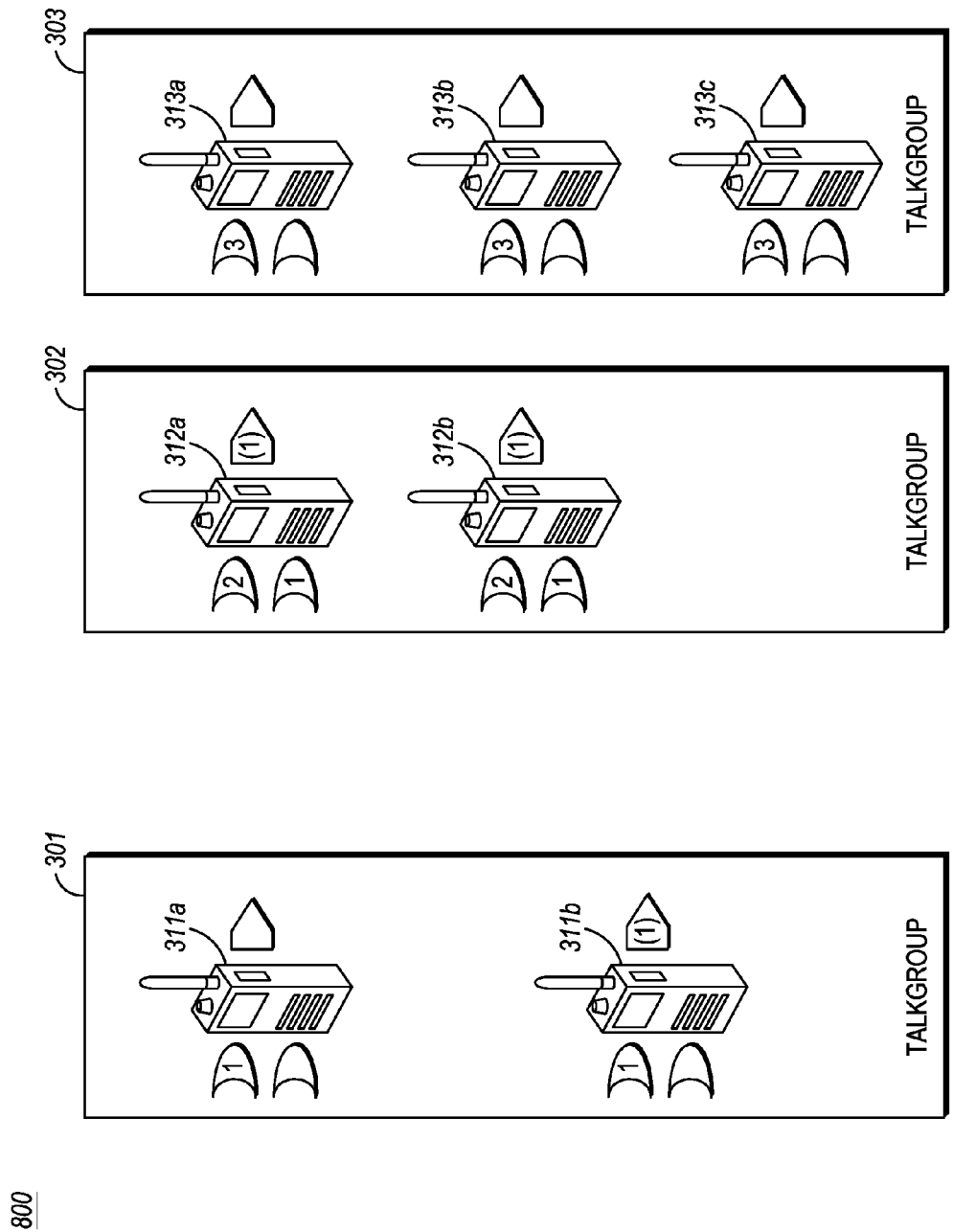
FIG. 8 depicts a fifth example scenario involving the mobile radios of FIG. 3, in accordance with an embodiment.

FIG. 8 depicts a fifth example scenario involving the mobile radios of FIG. 3, in accordance with an embodiment. In the example scenario 800 of FIG. 8, it can be seen that the mobile radios 312a and 312b in talkgroup 302 have responded to detecting receipt of the patch invite from the mobile radio 311a by residing their respective second receivers on channel 1, as was specified in the patch invite. The mobile radios 312a and 312b are also depicted with a "(1)" status in their respective transmit-channel indicators, further confirming that they are participating in the patched-talkgroup session on channel 1. All three of the mobile radios 311b, 312a, and 312b may have also unmuted channel 1, so as to enable their respective users to hear audio in connection with the patched-talkgroup session on that channel. In at least one embodiment, the respective mobile radios first validate the patched-talkgroup session on channel 1 prior to unmuting channel 1.

Figure 9:
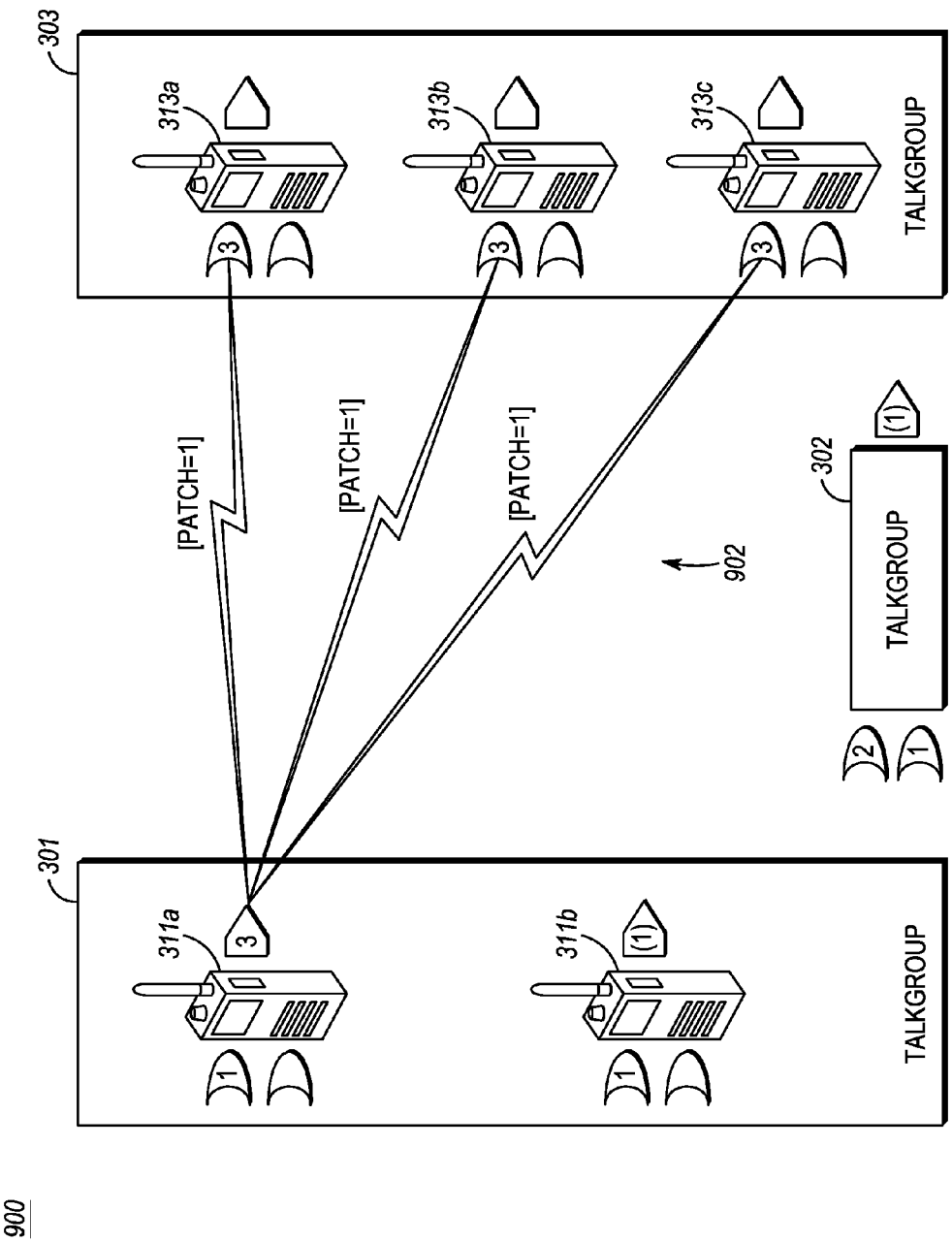
FIG. 9 depicts a sixth example scenario involving the mobile radios of FIG. 3, in accordance with an embodiment.

FIG. 9 depicts a sixth example scenario involving the mobile radios of FIG. 3, in accordance with an embodiment. In the example scenario 900 of FIG. 9, the talkgroup 302 is, for convenience only, shown in a reduced form, though it can be seen in FIG. 9 that each mobile radio in talkgroup 302 has its first receiver on channel 2, its second receiver on channel 1, and will transmit any bearer data in connection with the patched-talkgroup session on channel 1. It can further be seen in FIG. 9 that the mobile radio 311a transmits a patch invite on channel 3, which is the radio channel that is associated with talkgroup 303. This patch invite is shown at 902, and specifies that the mobile radio 311a is inviting the mobile radios 313a, 313b, and 313c (and any other mobile radios in talkgroup 303) to participate in a patched-talkgroup session on channel 1.

Figure 10:
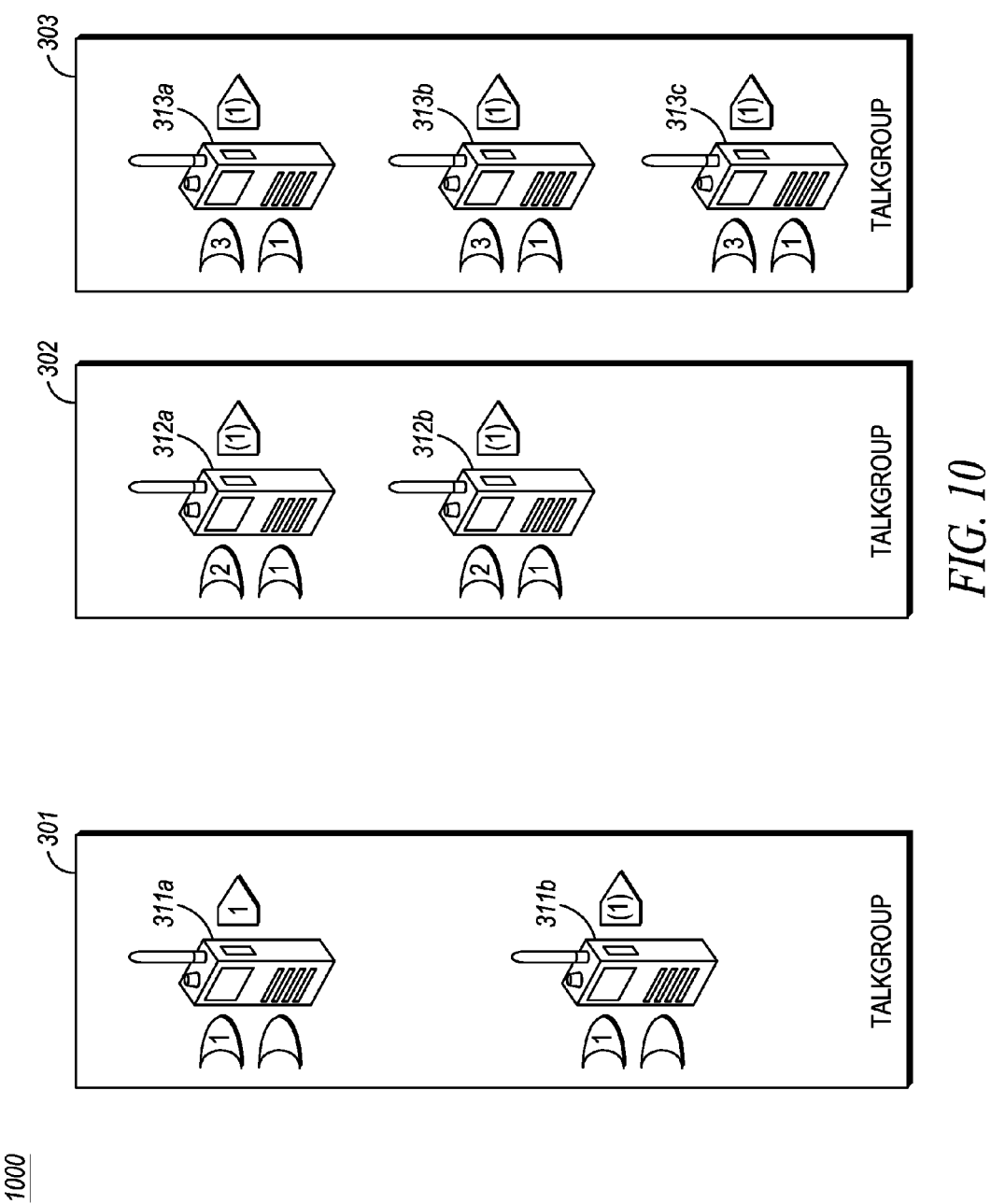
FIG. 10 depicts a seventh example scenario involving the mobile radios of FIG. 3, in accordance with an embodiment.

FIG. 10 depicts a seventh example scenario involving the mobile radios of FIG. 3, in accordance with an embodiment. In the example scenario 1000 of FIG. 10, the patched-talkgroup session has been established. The example scenario 1000 of FIG. 10 is similar to the example scenario 800 of FIG. 8, with the difference in the example scenario 1000 being that the mobile radios 313a, 313b, and 313c of talkgroup 303 are now also participating in the patched-talkgroup session on channel 1, as evidenced by their respective second receivers residing on channel 1, and by the "(1)" statuses in their respective transmit-channel indicators. Thus, one or more of (i) the mobile radios 311a and 311b of talkgroup 301, (ii) the mobile radios 312a and 312b of talkgroup 302, and (iii) the mobile radios 313a, 313b, and 313c of talkgroup 303 may then participate in the patched-talkgroup session by (a) receiving audio (and/or video, images, and the like) on channel 1 as a participant in the patched-talkgroup session and/or (b) transmitting audio (and/or video, images, and the like) on channel 1 as a participant in the patched-talkgroup session.

Figure 11:
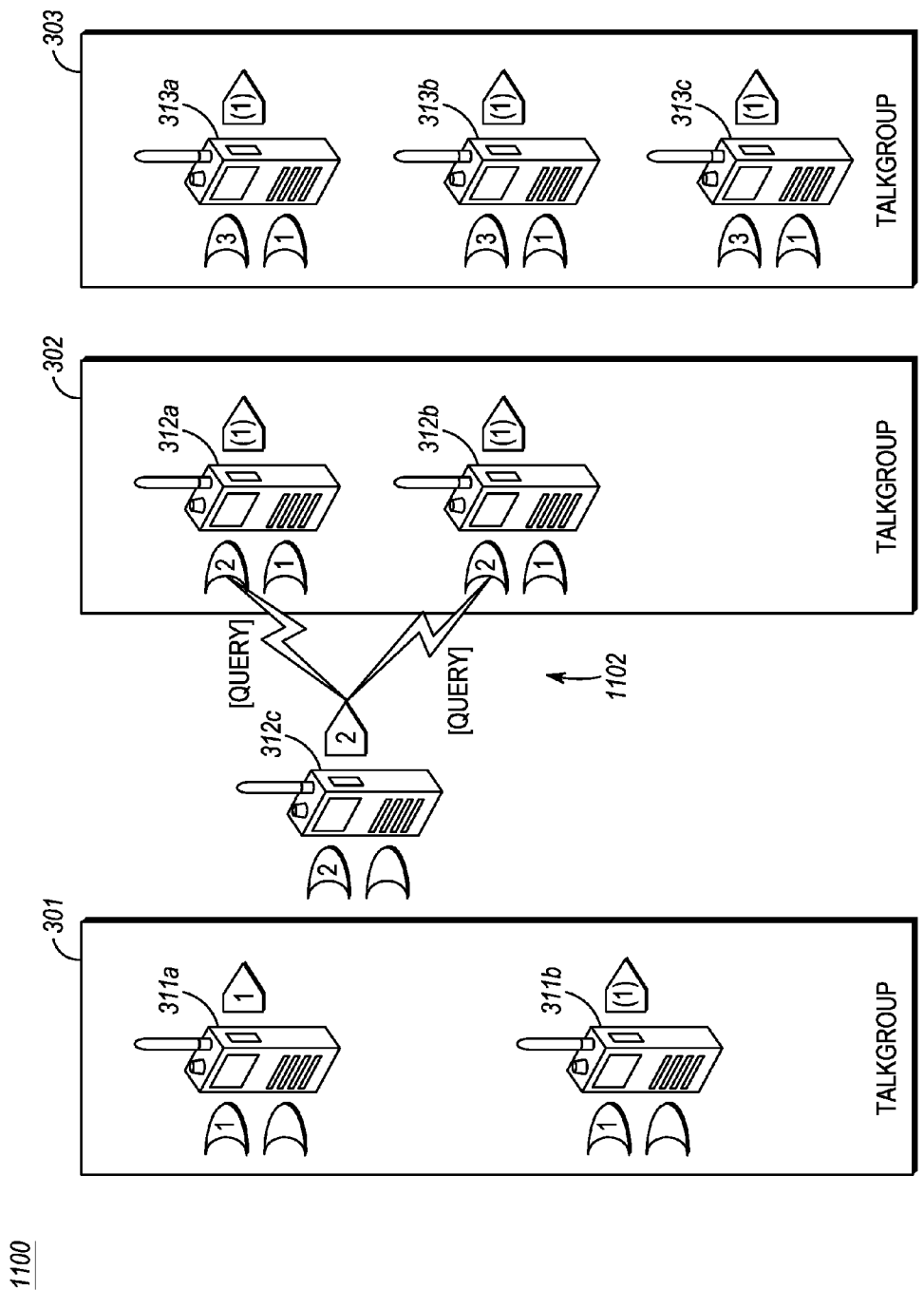
FIG. 11 depicts an eighth example scenario involving the mobile radios of FIG. 3, in accordance with an embodiment.

FIG. 11 depicts an eighth example scenario involving the mobile radios of FIG. 3, in accordance with an embodiment. In the example scenario 1100 of FIG. 11, another member of talkgroup 302 (i.e., a mobile radio 312c) is a late arrival (in that the patched-talkgroup session on channel 1 has already begun). In various different examples, the mobile radio 312c could have previously been out of range and is now in range, or could have been previously powered off and is now powered on, and/or perhaps a different series of events transpired to result in the mobile radio 312c being a late arrival. Perhaps as part of a startup sequence, or perhaps as part of a periodic process, as examples, the mobile radio 312c transmits (at 1102) a query on channel 2, which is the channel that is associated with the talkgroup (i.e., talkgroup 302) of which the mobile radio 312c is a member. As depicted in FIG. 11, this query is received by both the mobile radio 312a and the mobile radio 312b on their respective first receivers, both of which as described above are residing on channel 2.

Figure 12:
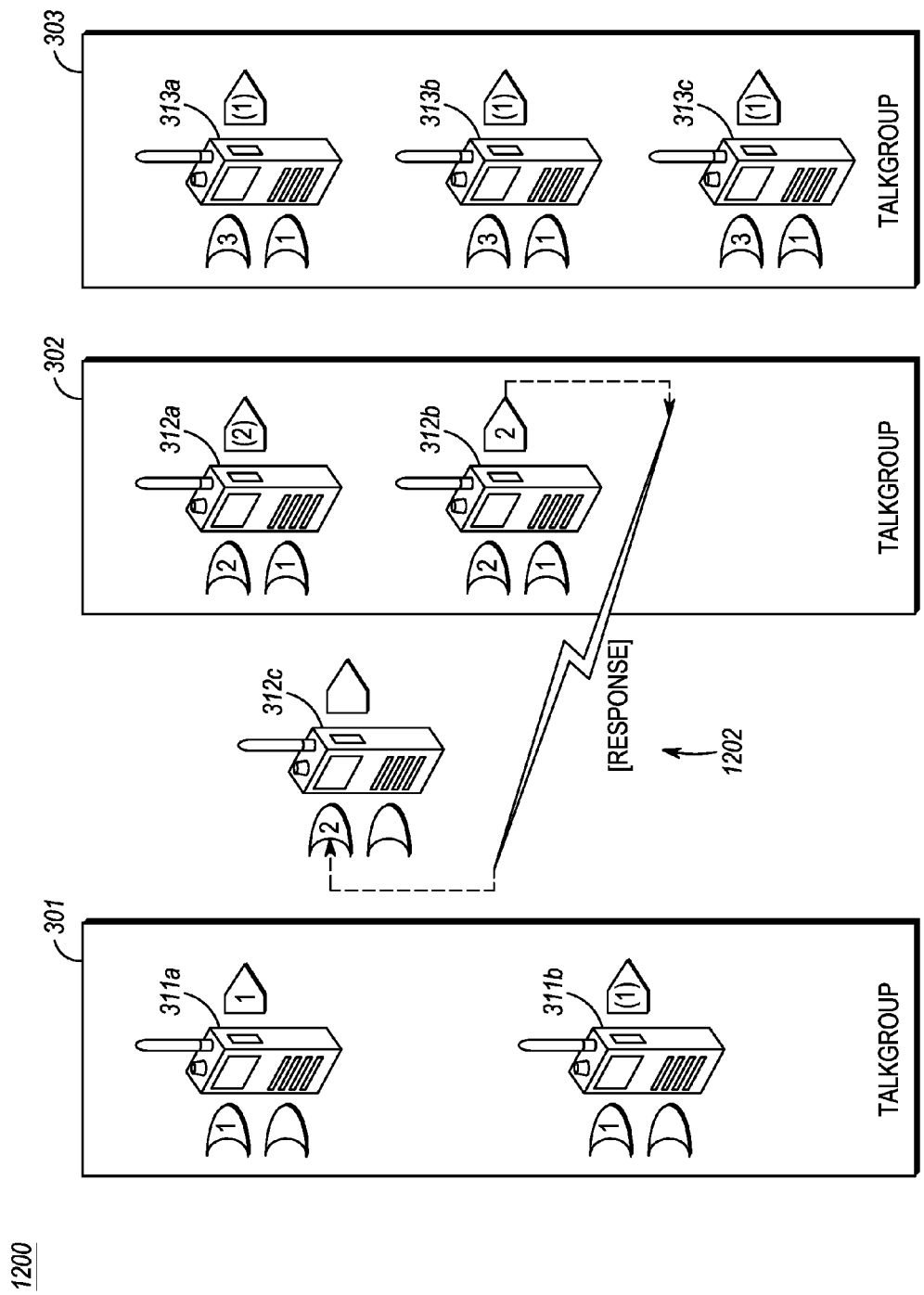
FIG. 12 depicts a ninth example scenario involving the mobile radios of FIG. 3, in accordance with an embodiment.

FIG. 12 depicts a ninth example scenario involving the mobile radios of FIG. 3, in accordance with an embodiment. The example scenario 1200 of FIG. 12 depicts and embodiment in which, responsive to detecting the query at 1102, transmits a response at 1202 to the mobile radio 312c on channel 2. The mobile radio 312c receives that response on its first receiver, which is residing on channel 2. The response includes data that informs the mobile radio 312c that a patched-talkgroup session is currently occurring on channel 1.

It can also be seen in FIG. 12 that the mobile radio 312a has its transmitter tuned to channel 2, in preparation for perhaps transmitting a query response to the mobile radio 312c. In at least one embodiment, in response to detecting the query at 1102, both the mobile radio 312a and the mobile radio 312b initiate a respective random-duration timer, and then only send a query response if their respective random-duration timer expires without the respective mobile radio yet detecting a query response being transmitted on their talkgroup channel (i.e., on channel 2 in this example). Thus, the example scenario 1200 depicts an instance in which the random-duration timer that was initiated by the mobile radio 312b was shorter than the random-duration timer that was initiated by the mobile radio 312a. When the mobile radio 312b detected its random-duration timer having expired without a query response having been sent on channel 2, the mobile radio 312b responsively sent the query response on channel 2. Thereafter, when the mobile radio 312a detected the query response from the mobile radio 312b on channel 2 at a time when its own random-duration timer had not yet expired, the mobile radio 312a canceled its random-duration timer and thus did not send a query response.

Figure 13:
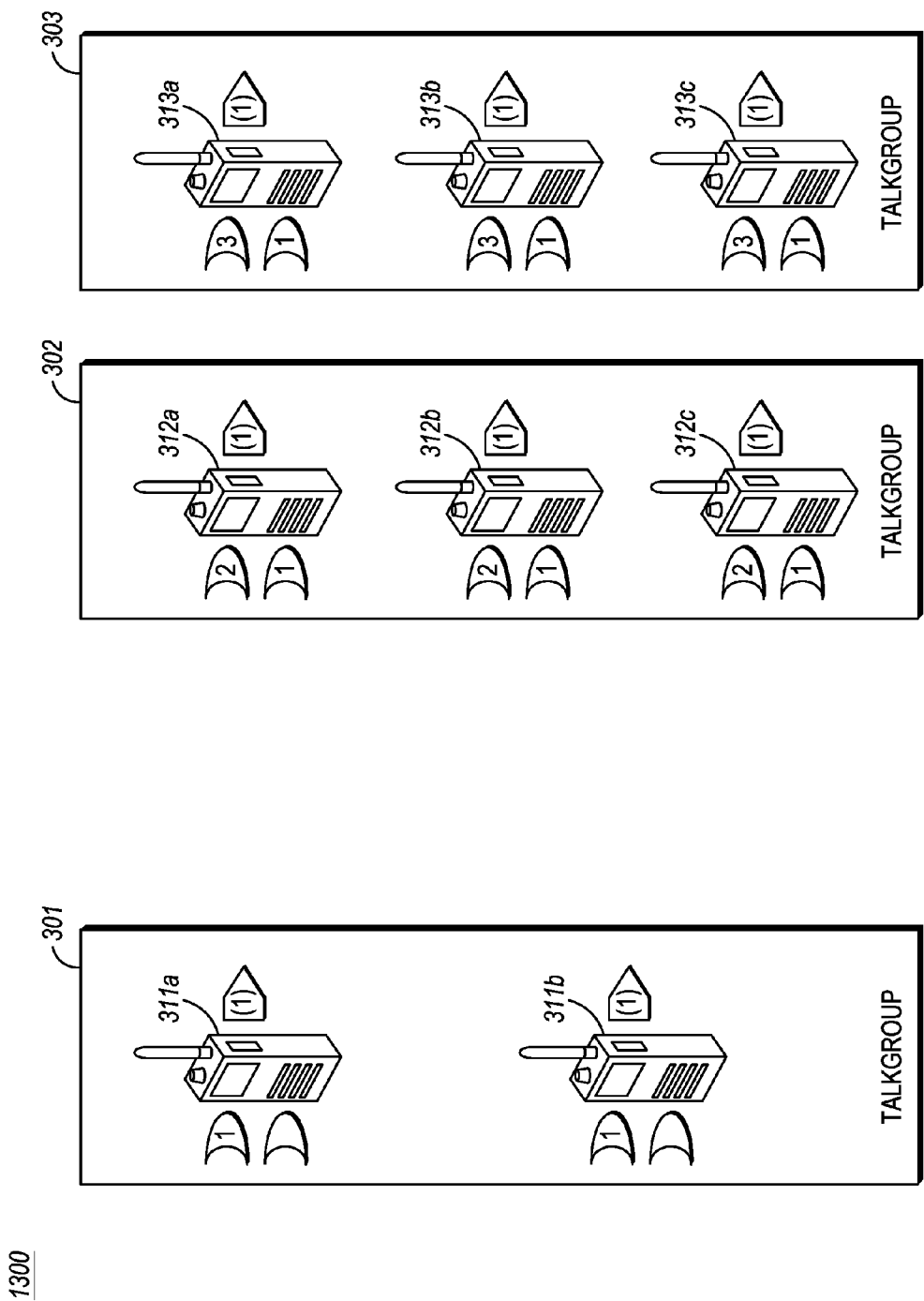
FIG. 13 depicts a tenth example scenario involving the mobile radios of FIG. 3, in accordance with an embodiment.

FIG. 13 depicts a tenth example scenario involving the mobile radios of FIG. 3, in accordance with an embodiment. The example scenario 1300 of FIG. 13 is quite similar to the example scenario 1000 of FIG. 10, other than that the mobile radio 312c has now joined the patched-talkgroup session on channel 1, as depicted by the mobile radio 312c having resided its second receiver on channel 1 as directed by the query response from the mobile radio 312b, and as further depicted by the "(1)" status in its respective transmit-channel indicator.

In at least one embodiment, the mobile radio 311a may at a certain point transmit a patch termination on channel 1, indicating a termination of the patched-talkgroup session on channel 1. In at least one such embodiment, the mobile radio 311a may, after completing a transmission of (e.g., audio) data as a participant in the patched-talkgroup session, initiate what is known in the art as a hang timer. Upon expiration of that hang timer, If the mobile radio 311a makes or receives a transmission as part of the patched-talkgroup session while that hang timer has not yet expired, the mobile radio 311a may responsively reset and/or cancel the hang timer. If, however, the hang timer does expire due to lack of such a transmission being sent or received, the mobile radio 311a may responsively transmit the aforementioned patch termination on channel 1 to signal termination of the patched-talkgroup session. Upon receipt of such a patch termination on channel 1, one or more of the other mobile radios that had been participating in the patched-talkgroup session (e.g., the mobile radios 312a, 312b, and 312c of talkgroup 302 and the mobile radios 313a, 313b, and 313c of talkgroup 303) may responsively mute their respective second receivers and/or tune their respective second receivers away from channel 1.

Figure 14:
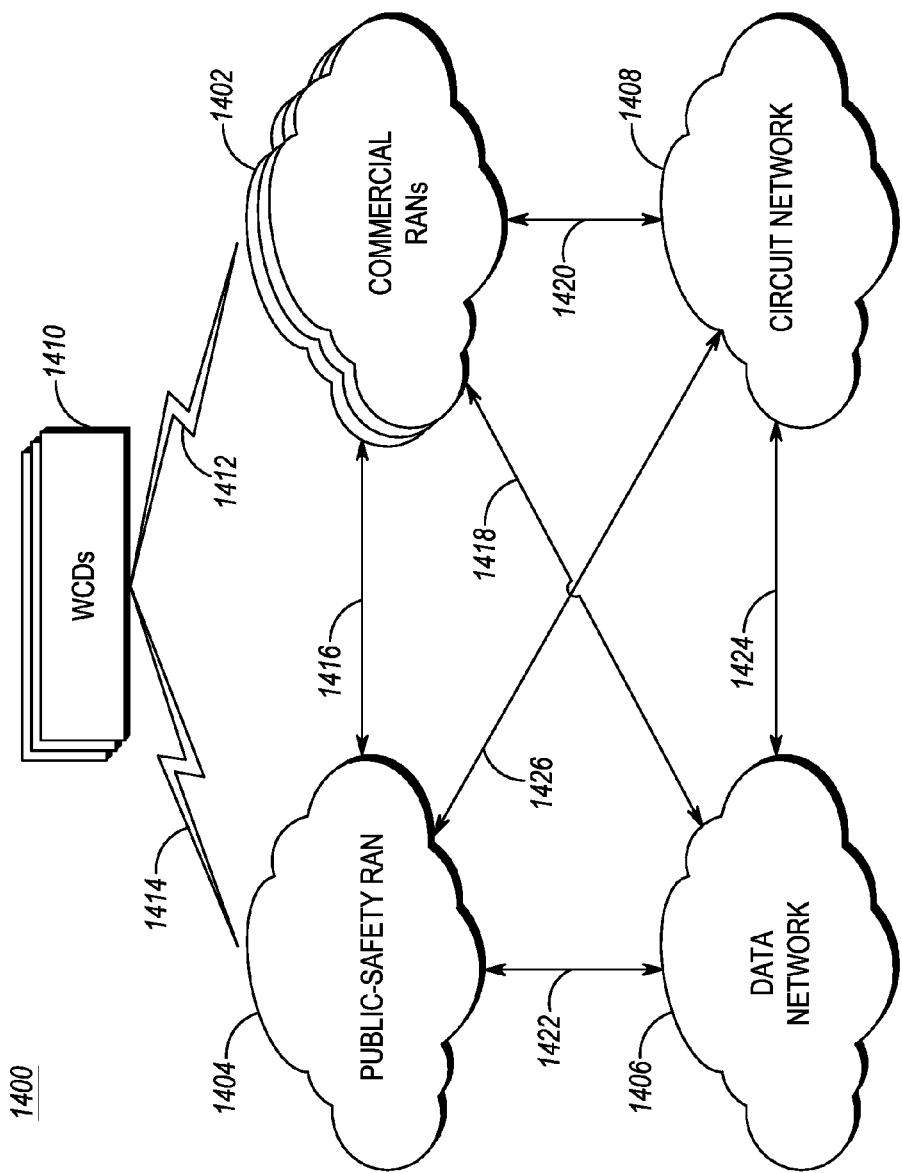
FIG. 14 depicts an example communication system, in accordance with an embodiment.
Figure 15:
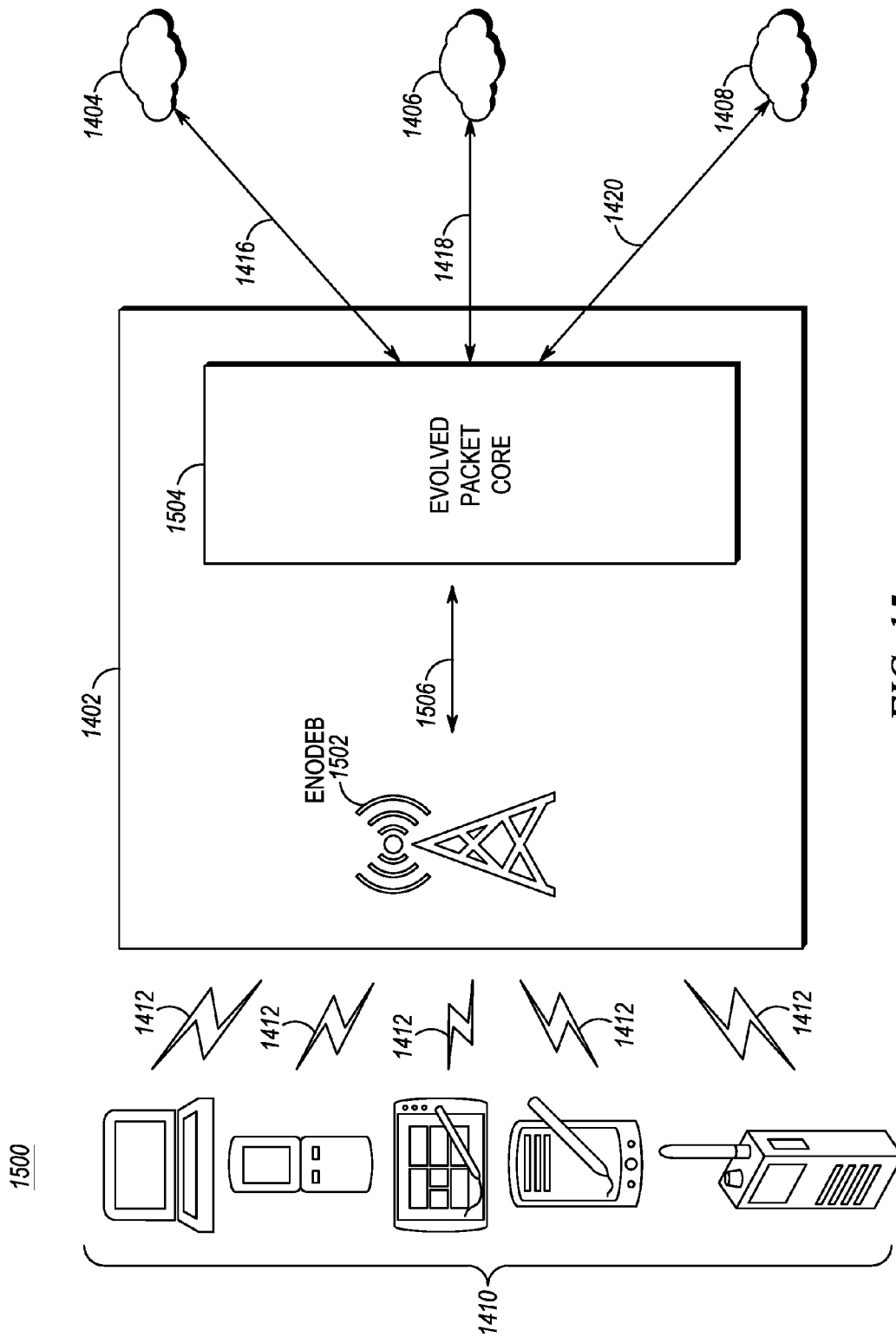
FIG. 15 depicts a further example of the communication system of FIG. 14, in accordance with an embodiment.

The next portion of this disclosure includes descriptions of FIGS. 14-15, which in general depict a communication system in which mobile radios communicate via one or more radio access networks (RANs). It is explicitly noted that mobile radios that communicate via one or more RANs may also be capable of communicating directly with one another in the manner described above. Thus, while mobile radios that are capable of engaging in communication directly with one another but not via one or more RANs could certainly carry out and embody the present methods and systems, mobile radios that are capable of both direct-mode and RAN-based communication could certainly carry out and embody the present methods and systems as well.

FIG. 14 depicts an example communication system, in accordance with an embodiment. In particular, FIG. 14 depicts an example communication system 1400 that includes one or more commercial RANs 1402, a public-safety RAN 1404, a data network 1406, a circuit network 1408, mobile radios 1410, and communication links 1412-1426.

An example commercial RAN 1402 is discussed below in connection with FIG. 15, though in general, each RAN 1402 and the RAN 1404 includes typical RAN elements such as base stations, base station controllers, routers, switches, and the like, arranged, connected, and programmed to provide wireless service to user equipment (e.g., the mobile radios 1410) in a manner known to those of skill in the relevant art.

The public-safety RAN 1404 may include one or more packet-switched networks and/or one or more circuit-switched networks, and in general functions to provide one or more public-safety agencies with any necessary computing and communication needs. Thus, the public-safety RAN 1404 may include a dispatch center communicatively connected with the data network 1406 and also with the circuit network 1408, for retrieving and transmitting any necessary public-safety-related data and communications. The public-safety RAN 1404 may also include any necessary computing, data-storage, and data-presentation resources utilized by public-safety personnel in carrying out their public-safety functions. Moreover, the public-safety RAN 1404 may include one or more network access servers (NASs), gateways, and the like for bridging communications to one or more other entities and/or networks, such as the commercial RANs 1402, the data network 1406, and the circuit network 1408, as representative examples.

The data network 1406 may be, include, or be a part of the global network of networks typically referred to as the Internet. The data network 1406 may be a packet-switched network, and entities (i.e., servers, routers, computers, and the like) that communicate over the data network 1406 may be identified by a network address such as an Internet Protocol (IP) address. Moreover, the data network 1406 may include one or more NASs, gateways, and the like for bridging communications to one or more other entities and/or networks, such as the commercial RANs 1402, the public-safety RAN 1404, and the circuit network 1408, as representative examples.

The circuit network 1408 may be, include, or be a part of the circuit-switched telephone network commonly referred to as the public switched telephone network (PSTN), and in general functions to provide circuit-switched communications to various communication entities as is known in the art. Moreover, the circuit network 1408 may include one or more NASs, gateways, and the like for bridging communications to one or more other entities and/or networks, such as the commercial RANs 1402, the public-safety RAN 1404, and the data network 1406, as representative examples.

The depicted example communication system 1400 includes communication links 1412-1426, any one or more of which could include one or more wireless-communication links and/or one or more wired-communication links. In FIG. 14, the communication links 1412 and 1414 are depicted with respective lightning-bolt graphics; while this graphic typically denotes wireless communication, and does in this example as well, this is not to the exclusion of one or more of the other communication links 1414-1426 being or at least including wireless-communication links as well.

As can be seen in FIG. 14, the communication link 1412 (as mentioned above) connects the commercial RANs 1402 and the mobile radios 1410, the communication link 1414 (as mentioned above) connects the public-safety RAN 1404 and the mobile radios 1410, the communication link 1416 connects the commercial RANs 1402 and the public-safety RAN 1404, the communication link 1418 connects the commercial RANs 1402 and the data network 1406, the communication link 1420 connects the commercial RANs 1402 and the circuit network 1408, the communication link 1422 connects the public-safety RAN 1404 and the data network 1406, the communication link 1424 connects the data network 1406 and the circuit network 1408, and the communication link 1426 connects the public-safety RAN 1404 and the circuit network 1408. This arrangement is provided purely by way of example, as other arrangements could be implemented by those of skill in the relevant art in various different contexts.

The mobile radios 1410 may be any suitable computing and communication devices configured to engage in wireless communication with one or both of (i) the commercial RANs 1402 over the air interface 1412 as is known to those in the relevant art and (ii) the public-safety RAN 1404 over the air interface 1414 as is known to those in the relevant art. Some example mobile radios 1410 and communication links 1412 are discussed below.

FIG. 15 depicts a further example of the communication system of FIG. 14, in accordance with an embodiment. FIG. 15 depicts the communication system 1400 of FIG. 14, though in more detail regarding some example mobile radios 1410 and an example commercial RAN 1402, although a similar figure could be depicted with the sole change being the use of an example public-safety RAN 1404 instead of the example commercial RAN 1402. In particular, FIG. 15 depicts the RAN 1402 as including an eNodeB 1502, which communicates directly or indirectly with an evolved packet core (EPC) 1504 over a communication link 1506. As is the case with each of the links mentioned above, and as is the case with any of the links mentioned anywhere else in this disclosure, the link 1506 may be or include one or more wireless-communication links and/or one or more wired-communication links, as deemed suitable by those of skill in the relevant art in a given context.

In at least one embodiment, the eNodeB 1502 includes the hardware and software (and/or firmware) necessary for the eNodeB 1502 to function as an eNodeB, a NodeB, a base station, a base transceiver station (BTS), a WiFi access point, and/or the like, as known to those having skill in the relevant art. In some instances, the eNodeB 1502 in the example RAN 1402 may also include functionality typically associated in the art with entities that are often referred to by terms such as base station controllers (BSCs), radio network controllers (RNCs), and the like. Also, while one eNodeB 1502 is depicted by way of example in FIG. 15, any suitable number of eNodeBs could be deployed as deemed suitable by those of skill in the relevant art.

In general, the eNodeB 1502 is an entity that, on one side (i.e., the wireless-network side (interface)), engages in wireless communication over the air interface 1412 with one or more mobile radios 1410 according to a protocol such as LTE or the like and, on the other side (i.e., the "backhaul" side), engages in communications with the EPC 1504 via the communication link 1506, to facilitate communications between various mobile radios 1410 and networks such as the networks 1404, 1406, and 1408.

The EPC 1504 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the mobile radios 1410 via the eNodeB 1502, and to bridge such wireless service with various transport networks. In general, a commercial RAN and a public-safety RAN may each provide wireless service according to a protocol such as LTE, WiFi, and/or the like. These examples are provided for illustration and not by way of limitation; moreover, those of skill in the relevant art are aware of variations among different protocols and among different implementations of a given protocol, and of similarities across different protocols.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method carried out by a mobile radio that is a member of a first talkgroup associated with a first radio channel, the mobile radio comprising first and second receivers, the method comprising:

residing the first receiver on the first radio channel;

detecting either a first patch event or a second patch event, wherein the first patch event is receipt of a patch-initiation instruction for a first-channel patched-talkgroup session, wherein the second patch event is receipt of a patch invitation on the first radio channel from a second mobile radio that is a member of a second talkgroup associated with a second radio channel, the received patch invitation specifying the second radio channel for a second-channel patched-talkgroup session;

responsive to detecting the first patch event, carrying out a set of patch-initiation functions that includes transmitting a patch invitation on each radio channel in a set of radio channels that are respectively associated with talkgroups in a set of talkgroups that includes the first talkgroup and at least one other talkgroup, each transmitted patch invitation specifying the first radio channel for the first-channel patched-talkgroup session; and responsive to detecting the second patch event, carrying out a set of patch-joining functions that includes residing the second receiver on the second radio channel for the second-channel patched-talkgroup session.

2. The method of claim 1, wherein the mobile radio detects the first patch event.

3. The method of claim 2, wherein the set of patch-initiation functions further includes at least one of (i) receiving audio on the first radio channel as a participant in the first-channel patched-talkgroup session and (ii) transmitting audio on the first radio channel as a participant in the first-channel patched-talkgroup session.

4. The method of claim 2, wherein the mobile radio further comprises a user interface, wherein the mobile radio receives the patch-initiation instruction via the user interface.

5. The method of claim 2, wherein the mobile radio receives the patch-initiation instruction over an air interface.

6. The method of claim 2, wherein the received patch-initiation instruction identifies the at least one other talkgroup in the set of talkgroups.

7. The method of claim 6, wherein the mobile radio further comprises a user interface, the method further comprising presenting at least one selectable talkgroup via the user interface, wherein:
the mobile radio receives the patch-initiation instruction via the user interface;
the received patch-initiation instruction indicates at least one presented talkgroup as selected; and
the at least one other talkgroup in the set of talkgroups comprises the at least one selected talkgroup.

8. The method of claim 2, further comprising maintaining stored channel data that lists each talkgroup in the set of talkgroups and the respectively associated radio channels.

9. The method of claim 8, wherein transmitting the patch invitations comprises referencing the stored channel data to identify the radio channels respectively associated with the talkgroups in the set of talkgroups.

10. The method of claim 2, further comprising transmitting a patch termination on the first radio channel regarding the first-channel patched-talkgroup session.

11. The method of claim 10, wherein the mobile radio transmits the patch termination responsive to detecting an expiration of a hang timer.

12. The method of claim 1, wherein the mobile radio detects the second patch event.

13. The method of claim 12, wherein the set of patch-joining functions further includes at least one of (i) receiving audio on the second radio channel as a participant in the second-channel patched-talkgroup session and (ii) transmitting audio on the second radio channel as a participant in the second-channel patched-talkgroup session.

14. The method of claim 12, wherein the set of patch-joining functions further includes unmuting the second radio channel.

15. The method of claim 14, wherein the set of patch-joining functions further comprises validating the second-channel patched-talkgroup session prior to unmuting the second radio channel.

16. The method of claim 12, wherein residing the first receiver on the first radio channel comprises monitoring the first radio channel via the first receiver, wherein the set of patch-joining functions further includes:
continuing to monitor the first radio channel via the first receiver after residing the second receiver on the second radio channel for the second-channel patched-talkgroup session; and
during the second-channel patched-talkgroup session, detecting a query from a third mobile radio on the first radio channel via the first receiver, and responsively transmitting, to the third mobile radio on the first radio channel, a response to the query, the response directing the third mobile radio to reside its second receiver on the second radio channel for the second-channel patched-talkgroup session.

17. The method of claim 16, wherein the set of patch-joining functions further includes:
initiating a random-duration timer responsive to detecting the query from the third mobile radio on the first radio channel,
wherein the mobile radio transmits the response to the query responsive to detecting an expiration of the random-duration timer without first having detected any other responses to the query on the first radio channel.

18. The method of claim 12, further comprising receiving a patch termination on the second radio channel regarding the second-channel patched-talkgroup session, and responsively carrying out at least one of muting the second receiver and tuning the second receiver away from the second radio channel.

19. The method of claim 12, wherein the first and second talkgroups are respectively associated with first and second public-safety agencies.

20. A mobile radio that is a member of a first talkgroup associated with a first radio channel, the mobile radio comprising:
a wireless-communication interface that includes first and second receivers;
a processor; and
data storage containing instructions executable by the processor for causing the mobile radio to carry out a set of functions that includes:
residing the first receiver on the first radio channel;
detecting either a first patch event or a second patch event, wherein the first patch event is receipt of a patch-initiation instruction for a first-channel patched-talkgroup session, wherein the second patch event is receipt of a patch invitation on the first radio channel from a second mobile radio that is a member of a second talkgroup associated with a second radio channel, the received patch invitation specifying the second radio channel for a second-channel patched-talkgroup session;
responsive to detecting the first patch event, carrying out a set of patch-initiation functions that includes transmitting, via the wireless-communication interface, a patch invitation on each radio channel in a set of radio channels that are respectively associated with talkgroups in a set of talkgroups that includes the first talkgroup and at least one other talkgroup, each transmitted patch invitation specifying the first radio channel for the first-channel patched-talkgroup session; and
responsive to detecting the second patch event, carrying out a set of patch-joining functions that includes residing the second receiver on the second radio channel.

* * * * *